United States Patent
Campbell et al.

(10) Patent No.: US 7,418,732 B2
(45) Date of Patent: Aug. 26, 2008

(54) NETWORK SWITCHES FOR DETECTION AND PREVENTION OF VIRUS ATTACKS

(75) Inventors: David T. Campbell, Redmond, WA (US); Sergey Solyanik, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 522 days.

(21) Appl. No.: 10/180,622

(22) Filed: Jun. 26, 2002

(65) Prior Publication Data

US 2004/0003284 A1    Jan. 1, 2004

(51) Int. Cl.
*G06F 11/00*    (2006.01)
(52) U.S. Cl. ..................................................... 726/23
(58) Field of Classification Search ................... 726/13, 726/24, 23, 11
See application file for complete search history.

(56) References Cited

U.S. PATENT DOCUMENTS

| | | | |
|---|---|---|---|
| 5,414,833 A | 5/1995 | Hershey et al. | |
| 5,440,723 A | 8/1995 | Arnold et al. | |
| 5,796,942 A * | 8/1998 | Esbensen | 726/13 |
| 5,892,904 A | 4/1999 | Atkinson et al. | |
| 5,951,698 A * | 9/1999 | Chen et al. | 714/38 |
| 6,910,134 B1 * | 6/2005 | Maher et al. | 726/24 |
| 2002/0083175 A1 * | 6/2002 | Afek et al. | 709/225 |
| 2003/0115483 A1 * | 6/2003 | Liang | 713/201 |
| 2003/0120935 A1 * | 6/2003 | Teal et al. | 713/188 |
| 2004/0054498 A1 * | 3/2004 | Shipp | 702/182 |

\* cited by examiner

*Primary Examiner*—Emmanuel L Moise
*Assistant Examiner*—Ali S Abyaneh
(74) *Attorney, Agent, or Firm*—Woodcock Washburn LLP

(57) ABSTRACT

Network switches with enhanced processing power and a virus information database are used to detect possible virus attacks and identify the source of the attacks within a computer network. A network switch has multiple ports that are directly connected to different computers for routing network communication packets among the computers. The packets passing through the network switch are scanned for virus signatures and/or patterns of virus attacks. In an off-line scan mode, a copy of the packets passing through the switch is saved into a packet queue for scanning. Alternatively, in an on-line scan mode, packets received by the network switch are scanned for virus signatures or virus attack patterns before being forwarded to their destination ports.

16 Claims, 3 Drawing Sheets

NETWORK SWITCHES FOR DETECTION AND PREVENTION OF VIRUS ATTACKS

TECHNICAL FIELD

This invention relates generally to computer networks, and more particularly to a measure for detecting virus attacks and identifying the source of the attacks in a computer network.

BACKGROUND OF THE INVENTION

As Internet usage has become an integral part of our daily lives, the constant threat of attacks by computer viruses has also become an inseparable aspect of our computer experience. Every once in a while, a new computer virus epidemic will break out, with the virus spreading quickly over the Internet, finding its ways into large and small computer networks all over the world and wreaking havoc in those networks, causing significant losses in productivity and resources.

Even after the first wave of attacks by a computer virus has subsided, there is always the concern that the virus is just lying dormant somewhere and will resurrect and launch attacks again at a later time. After the initial attacks of a virus, protection against that virus is typically added to the firewall of a computer network to prevent the virus from reentering the network. A firewall is typically placed at the edge of a network for filtering packets coming from the outside world into the network. The firewall examines each packet it receives and tests it against various rules. If the packet passes, the firewall sends the packet on to its destination. This measure, however, does not prevent future attacks from within the network, since the network communications among computers in the network typically do not go through the firewall, which is placed at the interface of the network with other networks. Once a virus has entered a computer network, it is often difficult to determine which computers in the network have been infected. As a result, it is almost impossible to ensure that the virus has been eradicated from every computer in the network, especially when the network contains many computers. Later, at an unexpected time, an infected computer may start to attack other computers in the network.

One difficulty in stopping such virus attacks from within the network is that it is often hard to identify the physical computer that houses the virus. For instance, the culprit may be an old, long-forgotten, server sitting somewhere in a closet or under a laboratory bench, with a non-descriptive device name that does not tell where the machine is. It may not be too difficult to trace the source of the virus attacks to a building or even a floor in the building, but pinpointing the perpetrator more precisely without causing major disruption to network operations is usually very difficult and sometimes nearly impossible.

SUMMARY OF THE INVENTION

In view of the foregoing, the present invention provides a network router system for providing protection against virus attacks. This system uses "smart" network switches to scan network traffic packets passing through the switches for virus signatures or patterns of possible virus attacks. A network switch has multiple ports connected directly to different computers on a local computer network, such as an Ethernet network. When the network switch receives incoming network communication packets at one of its ports, it scans the packets for virus signatures or attack patterns. The detection of a virus signature or attack pattern indicates the computer connected to that port is infected. Due to the one-to-one connection of the switch ports to the physical computers, the source of a detected virus attack can be clearly identified. The virus scan may be performed "off-line" by storing a copy of the received packets in a memory buffer for scanning while forwarding the packets immediately to the destination port. Alternatively, the virus scan may be performed "on-line," i.e., the received packets are scanned immediately and are forwarded to the destination port only if they are free of virus signatures or any virus attack pattern.

DETAILED DESCRIPTION OF THE INVENTION

Figure 1:
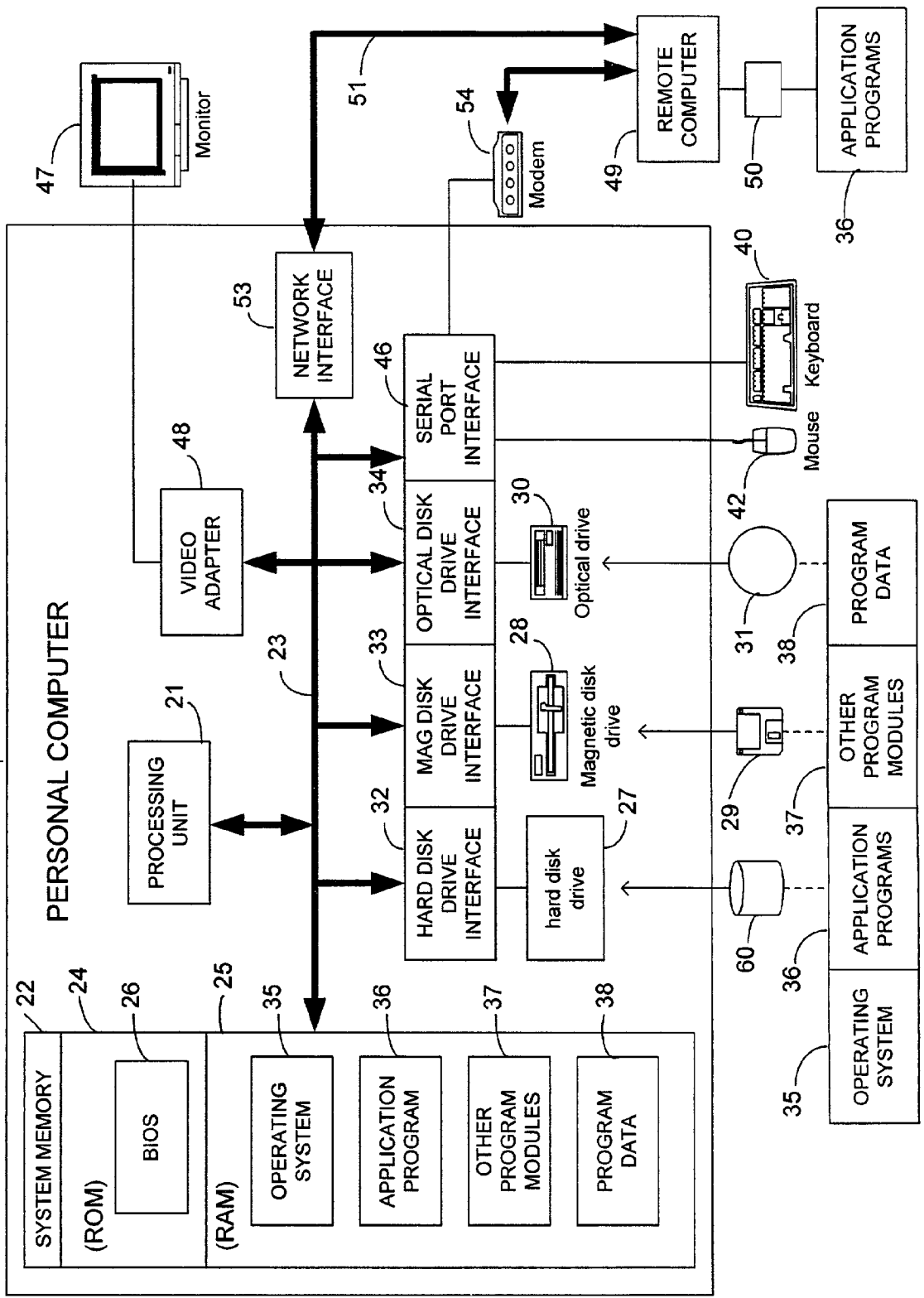
FIG. 1 is a block diagram generally illustrating an exemplary computer system on which components of a test framework in accordance with the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used for implementing components of an exemplary system of the invention, and the invention will be described in greater detail with reference to FIGS. 2 and 3. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
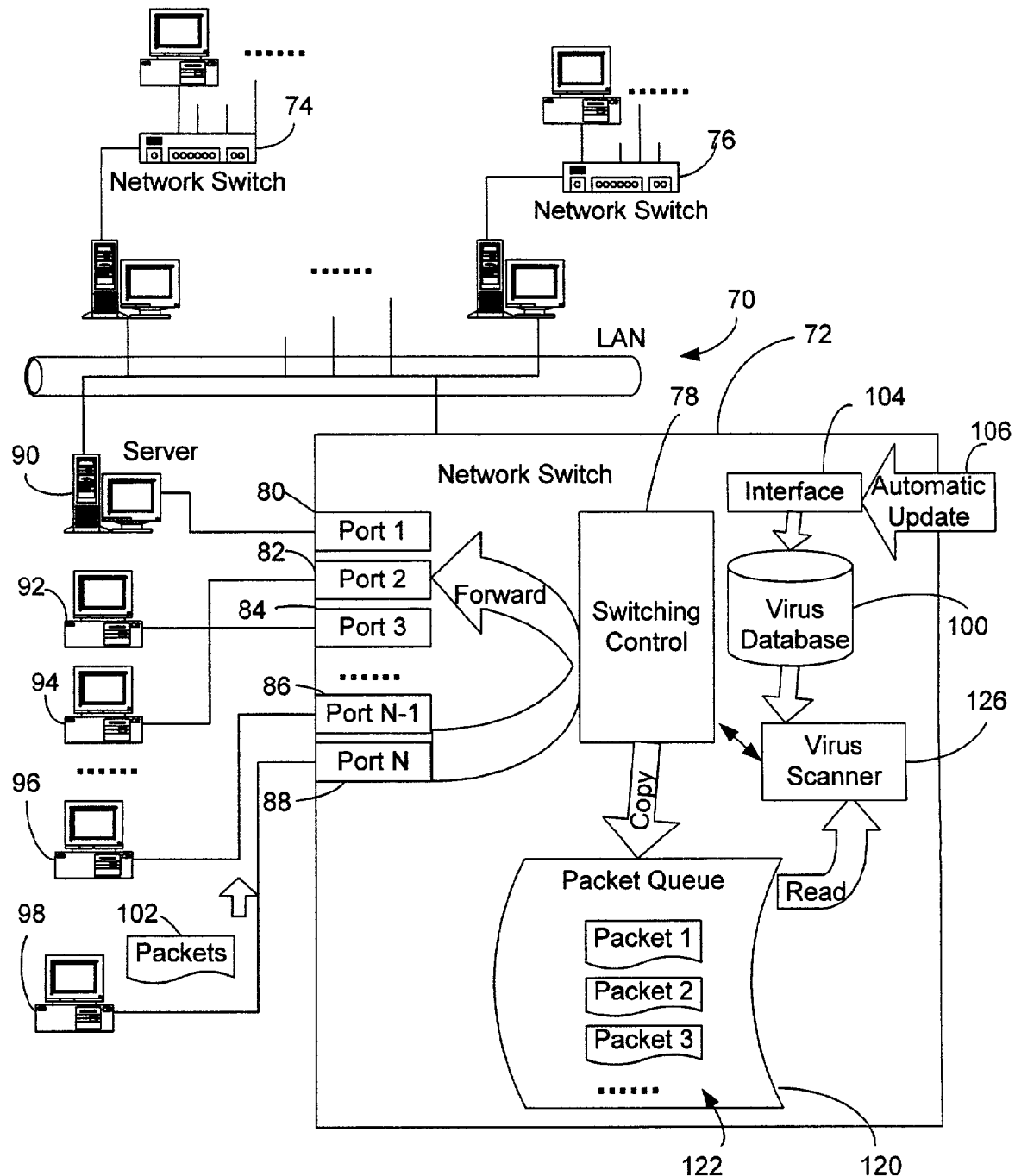
FIG. 2 is a schematic diagram showing an embodiment of a computer network in accordance with the invention that detects possible virus attacks from a computer in the network by scanning packets passing through a network switch for virus signatures or attack patterns.

Referring now to FIG. 2, the present invention is directed to a new approach to the detection of virus attacks from within a computer network and the identification of the computer from which the virus attacks are launched. This approach is based on the use of "smart" network switches that are provided with sufficient processing power to scan the network traffic passing through the switches for known virus signatures or virus attack patterns.

As shown in FIG. 2, a local area network (LAN) 70 typically employs a plurality of network switches 72, 74, 76 for routing network traffic between computers in the network. Each network switch has a plurality of ports, each of which can be connected directly to a physical computer, which may be a user computer or a LAN server. For instance, as illustrated in FIG. 2, the network switch 72 has a plurality of communication ports 80, 82, 84, 86, 88 connected to a LAN server 90 and a plurality of user computers 92, 94, 96, 98, respectively. The local area network 70 employing the network switches may have one of the various network architectures, such as Ethernet, Fast Ethernet, Token Ring, and FDDI, etc., and may handle communication packets based on different protocols. Generally, a network switch cross-links the stations and/or LAN segments connected to its ports by receiving incoming packets through one port to which the sender is connected and forwarding the packets to another port to which the intended receiver of the packets is connected. Thus, a typical network switch with sixteen ports can simultaneously route network packets between eight sender/receiver pairs directly connected to its ports. A switching control component 78 of the switch controls the routing of network communication packets between the ports of the switch. When a packet is received at a port, the switching control 78 identifies a destination port for that packet from information in the packet, and forwards the packet to the destination port.

In accordance with the invention, the network switches in the LAN 70 are provided with a virus scanner module for monitoring the network traffic passing through their ports and matching the traffic against known virus signatures and/or detecting patterns of virus attacks. In this regard, these network switches are significantly "smarter" than conventional network switches, which are relatively "dumb" devices that have very limited processing power and usually run simple proprietary operating systems. In contrast, the network switches in accordance with the invention require a significant amount of computing power and preferably has a powerful operating system, since the processing involved in virus signature matching and pattern detection has to be performed at a fairly high rate, and the administration and updating of the virus signature information and rules may be a relatively complex task.

To enable the scanning of network traffic for virus signatures, the network switch 72 is provided with a virus information database 100, which contains signatures and/or attack patterns of known viruses. The network traffic packets received through any port of the network switch 72 may be matched against the virus signatures and/or attack patterns in the database. In the illustrated embodiment, the network switch includes an external interface 104 for receiving settings of alert states, administrative instructions, and update information 106 for the virus database 100. It will be appreciated that the network switch is not limited to a single-processor, single-housing configuration. For instance, the switching control 78 of the network switch 72 may be contained in one housing with the multiple ports mounted thereon (in a way similar to conventional switches), while the virus scanner 126, the virus database 100, and the packet queue 120 (described below) may be parts of a separate computer connected to the switching control.

The term "virus signature" as used herein means broadly any discernable binary or textual patterns in the packets sent out by an infected computer in connection with attacks by the virus. For instance, a virus signature may be a binary pattern that can be matched to the binary code of a know virus. The "attack pattern" of a virus, on the other hand," refers to a recognizable pattern of actions taken by a virus while it tries to attack another computer via network communications. For instance, the pattern may be a sequence of requests sent by the infected computer trying to open sequential ports on a sequence of IP addresses. The following shows an example of a virus attack pattern, which includes a series of e HTTP requests sent out by a computer infected by the Code Red virus as attacks on a Web server:

Sat, 23 Feb. 2002 11:11:21 157.58.163.32 GET/scripts/
..π5c../winnt/system32/cmd.exe 404
Sat, 23 Feb. 2002 11:11:22 157.58.163.32 GET/scripts/
..π5c../winnt/system32/cmd.exe 404
Sat, 23 Feb. 2002 11:11:22 157.58.163.32 GET/scripts/
..%5c../winnt/system32/cmd.exe 404
Sat, 23 Feb. 2002 11:11:23 157.58.163.32 GET/scripts/
..%2f../winnt/system32/cmd.exe 404

An advantage of the use of network switches for detection of virus signatures and/or attack patterns of viruses is that the network switches are uniquely positioned for such a task. Because the ports of a network switch are directly connected to respective physical computers in the network, the detection of a virus signature or a virus attack pattern by the switch allows an unambiguous determination of the source of the network traffic that contains the virus attack. Moreover, since the network switch stands between the computer hosting the virus and the other nodes in the LAN, the network switch can effectively prevent the spreading of the virus by blocking off any further traffic originating from the infected computer.

The scanning of traffic routed by a network switch for virus signatures or attack patterns may be performed either in an "off-line" mode or in an "on-line" mode, as described below. FIG. 2 shows an embodiment that implements the "off-line" scanning mode, which means that the scanning operation is done in parallel with the routing operation. When the switch 72 receives packets 102 from a device connected to one of its ports (e.g., the computer 98 connected to the port 88), it stores a copy of the received packets into a queue 120 of unscanned packets 122 in a buffer memory space. The network switch 72 then forwards the packets 102 immediately to a destination port (e.g., the port 82) to which the intended receiver (e.g., the computer 92) of the packets is connected, without waiting for the virus scanner 126 to complete scanning the packets stored in the queue.

In one embodiment, the virus scanner 126 of the network switch 72 processes the packets 122 in the packet queue 120 on a first-in-first-out (FIFO) basis. In other words, the oldest packet in the queue 120 will be scanned first for virus signatures or attack patterns. To scan a packet, the virus scanner 126 reads the content of the packet and matches it against the virus signatures stored in the virus information database 100 and determines whether this packet and previous packets from the same port together show a discernable pattern of virus attacks. After a packet is scanned, the memory space taken by that packet is released and can be used to store new incoming packets. If the incoming packets arrive at the switch 72 at a rate faster than the virus scanner's ability to scan them, the switch writes the new packets over the oldest unprocessed packets in the packet queue. As a result, some packets will be discarded from the packet queue 120 without being scanned. In that case, even though the switch's ability to prevent virus attacks is degraded in proportion to its deficiency in the scanning bandwidth, it is not lost entirely.

When the network switch 72 detects a virus signature or attack pattern in the network packets passing through its ports, it can take various steps to prevent the spreading of the virus. In a preferred embodiment, depending on the current alert set by the system administrator, the network switch 72 performs one of three actions. The network switch can alert the computer from which the virus attack originated that it is infected, or alert the system administrator that the computer is infected, or first shut off the port on which the infected computer is connected to prevent any further spreading of the virus and then alert the administrator about the virus problem.

Figure 3:
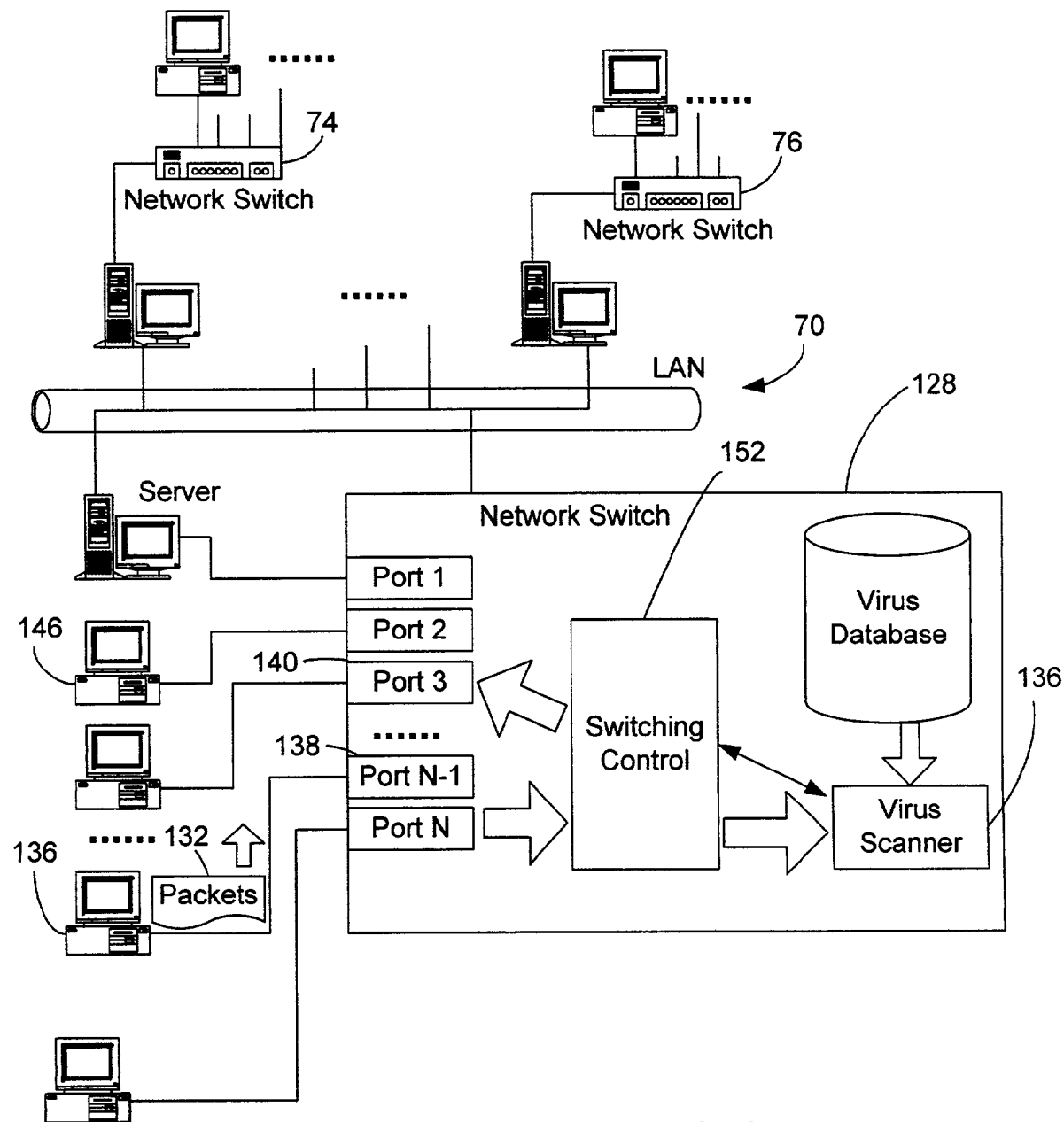
FIG. 3 is a schematic diagram showing an alternative embodiment of the invention that uses a network switch to scan packets received thereby for virus signatures or attack patterns before forwarding the packets to destination ports of the packets.

In an alternative embodiment shown in FIG. 3, a network switch 128 performs virus scan on the packets it receives in an "on-line" mode. In this mode, a packet 132 that comes to the switch 128 through any port (e.g., the port 138) is sent to the virus scanner 136 of the switch and scanned immediately by the virus scanner 136 for virus signatures or attack patterns. The packet 132 is forwarded to a destination port 140 to which the intended receiver of the packet is connected only if the packet is clean, i.e., no match with any virus signature in the virus database 150 is found and/or no attack pattern is discerned. In contrast to the off-line scan mode described above in connection with FIG. 2, the on-line scanning has the advantage that the contaminated traffic is stopped right away by the network switch, preventing the virus from spreading to another computer. On the other hand, since the scanning operation has to be done in real time in order to avoid any significant degradation of the switching speed, the switch has to be equipped with powerful processing capabilities, such as fast CUP and system bus, making this solution more expensive.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A local area computer network comprising:
   a plurality of computers; and
   at least one network switch comprising:

a plurality of ports, each port being directly connected to a respective one of the plurality of computers of the local area computer network;

a switching control programmed to route packets between the ports; and a virus scanner programmed to scan the packets for viruses for determining, from among the plurality of computers, a source computer of a virus, the determination being carried out by detecting the virus in packets received through a first port among the plurality of ports and using the first port to identify the source computer that is directly connected to the first ports, the virus scanner performing scanning in an off-line mode such that scanning is performed in parallel with the routing of packets by the switching control, the off-line scanning and the routing comprising:

receiving each packet from a device at a source port;

storing a copy of the received packet in a queue of un-scanned packets and also forwarding the received packet to a destination port thereof without waiting for the virus scanner to complete scanning the copied packet in the queue;

the virus scanner processing each packet in the queue on a first-in-first-out (FIFO) basis such that the oldest packet in the queue is processed first; and determining that incoming packets are arriving at the switch at a rate faster than the virus scanner can scan the incoming packets, and in response to so determining, writing each incoming packet over an oldest unprocessed packet in the queue such that at least some packets in the queue are discarded without being scanned.

2. The computer network of claim 1, wherein the network switch is operable to shut off the first port to which the source computer is directly connected, thereby preventing a spread of the virus.

3. A computer network as in claim 1, wherein the network switch includes a virus information database containing virus signatures of known viruses, and wherein the virus scanner matches the packets against the virus signatures in the virus information database.

4. A computer network as in claim 3, wherein the network switch is programmed to receive automatic updates for the virus information database.

5. A computer network as in claim 1, wherein the computer network is an Ethernet network.

6. A network switch for use in a local area computer network, the network switch comprising:

a plurality of ports, each port directly connected to a respective one of a plurality of computers in the local area computer network, wherein the network switch receives all packets of traffic within the local area computer network directly from the plurality of computers;

a switching control programmed to route packets between the ports by forwarding a packet received from an incoming port to a destination port; and a virus scanner programmed to scan all packets for viruses, for virus signatures, and for a pattern of virus attacks within the local area computer network, wherein:

the virus scanner detects at least one of a virus, a virus signature, and a pattern of virus attacks by matching scanned packets against virus signatures and attack patterns in a virus information database;

the switching control identifies, from among the plurality of computers in the local area computer network, a source computer of a virus, the source computer being uniquely identifiable by the incoming port of the network switch to which the source computer is connected; and the virus scanner performs scanning in an off-line mode such that scanning is performed in parallel with the routing of packets by the switching control, the off-line scanning and the routing comprising:

receiving each packet from a device at a source port;

storing a copy of the received packet in a queue of un-scanned packets and also forwarding the received packet to a destination port thereof without waiting for the virus scanner to complete scanning the copied packet in the queue;

the virus scanner processing each packet in the queue on a first-in-first-out (FIFO) basis such that the oldest packet in the queue is processed first; and determining that incoming packets are arriving at the switch at a rate faster than the virus scanner can scan the incoming packets, and in response to so determining, writing each incoming packet over an oldest unprocessed packet in the queue such that at least some packets in the queue are discarded without being scanned.

7. A network switch as in claim 6, further including a virus information database containing virus signatures of known viruses, and wherein the virus scanner matches the packets against the virus signatures in the virus information database.

8. A network switch as in claim 7, further including an interface for receiving automatic updates for the virus information database.

9. A computer-readable medium having computer-executable instructions for a network switch having a plurality of ports directly connectable to a plurality of network computers to perform steps comprising:

receiving a packet from a first port;

identifying, from information in the packet, a second port to which the packet is to be forwarded;

scanning the packet for viruses and for a pattern of virus attacks; and if a virus is found, identifying, from among the plurality of network computers, a source computer of the virus, the identification being carried out by identifying the first port and therefrom, the source computer directly connected to the first port.

the scanning being performed in an off-line mode such that the scanning is performed in parallel with forwarding of packets, the off-line scanning and the forwarding comprising:

receiving each packet from a device at a source port;

storing a copy of the received packet in a queue of un-scanned packets and also forwarding the received packet to a destination port thereof without waiting for scanning of the copied packet in the queue to be completed;

scanning each packet in the queue on a first-in-first-out (FIFO) basis such that the oldest packet in the queue is scanned first; and determining that incoming packets are arriving at a rate faster than each incoming packet can be scanned, and in response to so determining, writing each incoming packet over an oldest unprocessed packet in the queue such that at least some packets in the queue are discarded without being scanned.

10. A computer-readable medium as in claim 9, wherein the step of scanning scans the packet for virus signatures.

11. A computer-readable medium as in claim 10, wherein the step of scanning the packet includes retrieving virus signatures of known viruses from a virus information database for matching against the packet.

12. A computer-readable medium as in claim 11, having further computer-executable instructions for alerting the source computer of an infection by the virus.

13. A method for detecting virus attacks and sources of the virus attacks in a computer network, comprising:

connecting at least one network switch to a plurality of computers in the computer network, the network switch having a plurality of ports each of which is uniquely connected to a respective one of the plurality of computers; and operating the network switch to perform the steps of:
receiving a packet from a first port;
identifying a second port to which the packet is to be forwarded;
scanning the packet for viruses and for a pattern of virus attacks; and
if a virus is found, identifying, from among the plurality of computers,
a source computer of the virus by identifying the source computer directly connected to the first port.
the scanning being performed in an off-line mode such that the scanning is performed in parallel with forwarding of packets, the off-line scanning and the forwarding comprising:
receiving each packet from a device at a source port;
storing a copy of the received packet in a queue of un-scanned packets and also forwarding the received packet to a destination port thereof without waiting for scanning of the copied packet in the queue to be completed;
scanning each packet in the queue on a first-in-first-out (FIFO) basis such that the oldest packet in the queue is scanned first; and
determining that incoming packets are arriving at a rate faster than each incoming packet can be scanned, and in response to so determining, writing each incoming packet over an oldest unprocessed packet in the queue such that at least some packets in the queue are discarded without being scanned.

14. A method as in claim 13, wherein the step of scanning scans the packet for virus signatures.

15. A method as in claim 14, wherein the step of scanning the packet includes retrieving virus signatures of known viruses from a virus information database for matching against the packet.

16. A method as in claim 13, further comprising one of a) alerting a system administrator of the presence of the virus, b) alerting the source computer of the presence of the virus, and c) shutting down the incoming port to which the source computer of the virus is connected.

* * * * *

UNITED STATES PATENT AND TRADEMARK OFFICE
CERTIFICATE OF CORRECTION

| | | |
|---|---|---|
| PATENT NO. | : 7,418,732 B2 | |
| APPLICATION NO. | : 10/180622 | |
| DATED | : August 26, 2008 | |
| INVENTOR(S) | : David T. Campbell et al. | |

It is certified that error appears in the above-identified patent and that said Letters Patent is hereby corrected as shown below:

In column 7, line 13, in Claim 1, delete "ports," and insert -- port, --, therefor.

In column 8, line 44, in Claim 9, delete "port." and insert -- port, --, therefor.

In column 9, line 22, in Claim 13, delete "port." and insert -- port, --, therefor.

Signed and Sealed this
Twenty-sixth Day of April, 2011

David J. Kappos
*Director of the United States Patent and Trademark Office*